Patented Mar. 24, 1936

2,034,783

UNITED STATES PATENT OFFICE 2,034,783

PROCESS OF MAKING A THERAPEUTIC COMPOSITION

John Torigian, Queens Village, N. Y., assignor to The Drug Products Co., Inc., a corporation of New York No Drawing. Application March 16, 1933, Serial No. 661,097

2 Claims. (Cl. 167—68)

This invention relates to a therapeutic compound particularly efficacious in the treatment of the anemias.

Iron has long been recognized as the specific therapy for the anemias, but alone it is insufficient for the enriching of hemoglobin. While the reason for this is still in the realm of speculation, the fact is not questioned. It has been proved that the activity of iron in hemoglobin generation is enhanced by combining it with some other metal effective apparently as a catalyzer. For example copper has been demonstrated to be an effective supplement to iron in the treatment of anemia. Likewise manganese has been found to have a catalytic effect similar to copper, and it is also believed to act as a stabilizer.

These metals as a therapeutic agent have heretofore, so far as I am aware, been administered as a salt having crystalline form, for example as a chloride or a sulphate. It is my discovery that the iron, combined with one or both of the other metals mentioned, is a much more effective remedy for an anemic condition when administered in colloidal dispersion. It is generally accepted by recognized authorities that hemoglobin, like all life processes, is colloidal in character, and it may be assumed that, because of such character it is more amenable to the action of the metals in colloidal form.

In colloidal dispersion they are non-astringent, they seldom affect the teeth and rarely cause any gastric distress. In the colloidal dispersion they are more readily and more completely available to the blood stream for the increase of erythrocytes and hemoglobin. They are also more effectively assimilated upon ingestion.

In its broadest aspect my invention is not limited to any special process for obtaining the metals in a form to produce a colloidal dispersion, nor to any particular combination of ingredients. Colloidal iron alone is demonstrably more effective in the formation of hemoglobin than is a crystalline iron salt, but its assimilation is so markedly increased by the presence of one or both of the other metals, also preferably in colloidal dispersion that by preference the product involves such combination.

In accordance with my invention crystalline salts of the metals are colloidalized preferably in the presence of a dispersing agent so as to avoid agglomeration on subsequent evaporation to solid form. It is preferable to control the hydrogen ion concentration so that the pH of the solution will be on the acid side. The solids obtained by the evaporation may be prepared for oral use by dissolution in suitable solvents, or they may be made into a solution in ampul form suitable for injection. The very finely dispersed colloidal particles are easily filtered and under the ultra-microscope they display the Brownian movement or activity to a marked degree.

As a result of many experiments, I have concluded that the colloidal iron, colloidal copper and colloidal manganese are for the purpose best prepared by treating ferric chloride crystals, C. P., manganese chloride crystals, C. P., and cupric chloride crystals, C. P., with sodium carbonate anhydrous, C. P., acid gluconic and sodium hydroxide, C. P., with the addition of distilled water to form a solution having a hydrogen ion concentration (pH) of substantially 4.2. The iron, copper and manganese in a solid form and capable of dissolving in water to form a colloidal solution is prepared by evaporating, preferably in vacuo, the colloidal solution thus obtained.

More specifically I have carried out the process satisfactorily as follows:

(a) I dissolve 4254 grammes ferric chloride crystals, C. P., 915 grammes manganese chloride crystals, C. P., and 23.40 grammes cupric chloride crystals, C. P., in 5000 cubic centimeters (cc.) of distilled water and filter.

(b) I dissolve 2609.5 grammes acid gluconic in 2500 cubic centimeters (cc.) distilled water.

(c) I dissolve 567 grammes sodium carbonate anhydrous, C. P., in 1000 cubic centimeters (cc.) distilled water.

(d) I dissolve 451 grammes sodium hydroxide, C. P., in 5000 cubic centimeters (cc.) of distilled water.

(e) I then add solution (b) to solution (d), forming sodium gluconate.

(f) I then add solution (a) very slowly to solution (e), stirring all the time.

(g) I then add solution (c) to solution (f) slowly and stirring until the reaction ceases. This reaction results in the formation of sodium chloride and ferric hydroxide, manganese hydroxide and cupric hydroxide in colloidal dispersion, having the chemical formula of $Fe(OH)_3Mn(OH)_2Cu(OH)_2$ in a solution of $NaC_6O_7H_{11}$.

(h) I then add distilled water quantity sufficient to make 24 liters. This solution is then reduced to a solid form in vacuo at low temperature. This solid form is brownish green in color and is hygroscopic. Sugar coated compressed tablets are then prepared from this solid form. Each tablet contains 0.108 gm., of the materials in solid form and represents iron colloidal 14.00 mgm., manganese colloidal 4.70 mgm., and copper colloidal 0.14 mgm., when dissolved in water or gastric juice.

In order to produce a liquid preparation suitable for oral use, I dissolve the materials in solid form hereinbefore stated in 5 gallons of water, and then I add 120 pints of glycerin and 36 pints of alcohol. I then dissolve 6 lbs. peptone in six gallons of distilled water and add to the solution. I then add aromatic oils as a flavor and distilled water, quantity sufficient to make sixty gallons. If necessary I then add sufficient sodium hydroxide solution until the hydrogen ion concentration (pH) of substantially 4.2 is reached. Each 30 cc. of this solution produced, contains 0.865 gram of the materials in solid form which represents iron colloidal 112.5 mgm., manganese colloidal 37.5 mgm., and copper colloidal 1.125 mgm.

In preparing a solution in ampul form suitable for injections, I dissolve the solid materials in double distilled deaerated water and add 2% benzylic alcohol as a local anesthetic, filling same into ampuls. These ampuls are then sterilized in boiling water at a temperature not exceeding 100° C. If the ampuls are autoclaved, hydrolysis will take place with the separation and precipitation of the hydroxide of the metals.

The solution prepared for oral use, or for injectable purposes, when exhibited under the ultra-microscope, exhibits very fine particles active with Brownian movement.

I claim:

1. A process for preparing a colloidal, non-astringent, therapeutic agent of iron, copper and manganese which comprises preparing an aqueous solution of the chlorides of these metals, adding the solution slowly while stirring to a solution of sodium gluconate, adding to the resultant solution a solution of sodium carbonate, maintaining the pH on the acid side, and stirring until reaction ceases.

2. A process for preparing a colloidal, non-astringent, therapeutic agent of iron, copper and manganese which comprises preparing an aqueous solution containing approximately 4254 gms. of ferric chloride, approximately 915 gms. of manganese chloride and approximately 23 gms. of cupric chloride, adding this solution slowly while stirring to a solution containing the reaction mixture of approximately 2609 gms. of gluconic acid and 450 gms. of sodium hydroxide, and adding to the resultant solution a solution containing approximately 567 gms. of sodium carbonate.

JOHN TORIGIAN.